(12) United States Patent
Edwards et al.

(10) Patent No.: US 10,921,139 B2
(45) Date of Patent: Feb. 16, 2021

(54) SYSTEM AND METHOD FOR CONTROLLING MACHINES USING OPERATOR ALERTNESS METRICS

(71) Applicant: Caterpillar Inc., Deerfield, IL (US)

(72) Inventors: David James Edwards, Dunlap, IL (US); Scott Andrew Kirkman, Camp Hill (AU); Gregory Mark Wood, Queensland (AU); Andrew Thiel, Dunlap, IL (US); Ryan J. Howell, Denver, CO (US); Gregory Davis, Brisbane (AU)

(73) Assignee: Caterpillar Inc., Peoria, IL (US)

( * ) Notice: Subject to any disclaimer, the term of this patent is extended or adjusted under 35 U.S.C. 154(b) by 142 days.

(21) Appl. No.: 16/126,491

(22) Filed: Sep. 10, 2018

(65) Prior Publication Data
US 2020/0080851 A1 Mar. 12, 2020

(51) Int. Cl.
*G01C 21/34* (2006.01)
*B60W 40/08* (2012.01)
(Continued)

(52) U.S. Cl.
CPC .......... *G01C 21/343* (2013.01); *B60W 40/08* (2013.01); *B60W 50/00* (2013.01); *G05D 1/0291* (2013.01);
(Continued)

(58) Field of Classification Search
CPC .............. G01C 21/343; B60W 40/08; B60W 2040/0818; B60W 50/00; G05D 1/0291; G05D 2201/0202
See application file for complete search history.

(56) References Cited

U.S. PATENT DOCUMENTS

| 6,741,921 B2 | 5/2004 | Cohen |
| 2010/0094534 A1* | 4/2010 | Naick ................ G01C 21/3484 701/532 |

(Continued)

FOREIGN PATENT DOCUMENTS

| KR | 20160016189 | 2/2016 |
| WO | WO2016118122 A1 | 7/2016 |

*Primary Examiner* — Anne Marie Antonucci
(74) *Attorney, Agent, or Firm* — Lee & Hayes, PLLC (57) ABSTRACT

A method includes determining a first task requiring one of a plurality of machines to traverse along a first route and determining a second task requiring the one of the plurality of machines to traverse along a second route. The method also includes determining a first route score for the first route, the first route score being at least in part indicative of a difficulty of traversing along the first route, and determining a second route score for the second route, the second route score being at least in part indicative of a difficulty of traversing along the second route. The method may also include receiving sensor data generated by a sensor associated with a first machine of the plurality of machines and determining, based at least in part on the sensor data, an alertness metric associated with an operator of the first machine. Based at least in part on the alertness metric being equal to or greater than a threshold alertness metric, the method may also include determining the first task for completion by the first machine or determining the second task for completion by the first machine. The method may also include sending, to an electronic device associated with the operator of the first machine, information about the first route or the second route; and receiving confirmation information indicative of the first machine traversing along the first route or of the first machine traversing along the second route.

20 Claims, 5 Drawing Sheets

(51) Int. Cl.
  *B60W 50/00* (2006.01)
  *G05D 1/02* (2020.01)
(52) U.S. Cl.
  CPC ............... *B60W 2040/0818* (2013.01); *G05D 2201/0202* (2013.01)

(56) References Cited

U.S. PATENT DOCUMENTS

| | | |
|---|---|---|
| 2013/0046466 A1 | 2/2013 | Yucel et al. |
| 2015/0154845 A1* | 6/2015 | Wu ........................ G08B 21/06 340/575 |
| 2016/0092825 A1 | 3/2016 | Zimmer et al. |
| 2016/0247395 A1 | 8/2016 | Sugihara et al. |
| 2016/0274562 A1 | 9/2016 | Sugihara et al. |
| 2017/0017235 A1 | 1/2017 | Tanaka et al. |
| 2017/0154394 A1 | 6/2017 | Kan et al. |
| 2017/0286886 A1* | 10/2017 | Halepatali .............. G08G 1/202 |
| 2018/0032944 A1* | 2/2018 | Sarvana ........... G06Q 10/06311 |

\* cited by examiner

SYSTEM AND METHOD FOR CONTROLLING MACHINES USING OPERATOR ALERTNESS METRICS

TECHNICAL FIELD

This disclosure relates generally to controlling machines at worksites such as construction, industrial, and/or mining sites, and, more specifically, to systems utilizing sensors and data processing techniques to determine alertness metrics for operators of the machines, determine metrics, e.g., difficulty metrics, associated with tasks to be undertaken by the machines, and to control the machines at the worksite based on those metrics.

BACKGROUND

Many industrial worksites include machines and equipment to perform various functions. For example, a mining site may include excavators to mine ore and/or other materials and haul trucks to transport the mined materials and dispose of waste. The operations of such machines must be coordinated in order to maintain efficiency at the site. For example, a haul truck must be at the ready to receive and transport ore as the ore is extracted by an excavator. Accidents at the worksite may undermine efficiency and productivity, and human operators of the machines may be a cause of accidents. Accordingly, it may be useful to monitor conditions and/or events at the worksite to determine operator alertness, and control machines using these characteristics, thereby improving safety at the worksite.

An example system for fatigue optimized routing and tracking is described in U.S. Patent Application Publication No. 2017/0154394 (hereinafter referred to as the '394 reference). In particular, the '394 reference describes generating trip schedules from route plans and trip constraints such as hour-of-service regulations and business objectives. The methods described in the '394 reference may also determine driver sleep and fatigue based on the generated trip schedules. The '394 reference does not, however, disclose details related to utilizing in-cabin sensors in machines at a worksite to determine alertness and assign tasks. The '394 reference also does not disclose an in-real-time system or in-near-real-time system that can divert operators to new or different tasks and/or alert drivers to hazards based on alertness metrics and/or route metrics. As a result, incidents such as accidents or equipment failure may not be prevented by the techniques described in the '394 reference.

Example embodiments of the present disclosure are directed toward overcoming the deficiencies in conventional systems.

SUMMARY

In an aspect of the present disclosure, a method includes determining a first task for completion at a worksite and a second task for completion at the worksite. Completion of the first task requires one of a plurality of machines to traverse along a first route and completion of the second task requires the one of the plurality of machines to traverse along a second route. The method may also include determining a first route score for the first route, the first route score being at least in part indicative of a difficulty of traversing along the first route, and determining a second route score for the second route, the second route score being at least in part indicative of a difficulty of traversing along the second route. The method may also include receiving sensor data generated by a sensor associated with a first machine of the plurality of machines and determining, based at least in part on the sensor data, an alertness metric associated with an operator of the first machine. Based at least in part on the alertness metric being equal to or greater than a threshold alertness metric, the method may also include determining the first task for completion by the first machine or determining the second task for completion by the first machine. The method may also include sending, to an electronic device associated with the operator of the first machine, information about the first route or the second route, and receiving confirmation information indicative of the first machine traversing along the first route or of the first machine traversing along the second route.

In another aspect of the present disclosure, a system includes a plurality of machines disposed at a worksite, one or more processors, and memory storing processor-executable instructions. Each of the machines includes a cabin defined at least in part by a body and a sensor disposed in the cabin. When executed by the one or more processors, the processor-executable instructions configure the system to perform acts including determining a first task for completion at the worksite and determining a second task for completion at the worksite. Completion of the first task requires one of the plurality of machines to traverse along a first route from an origination location to a first destination, and completion of the second task requires one of the plurality of machines to traverse along a second route from the origination location to a second destination. The acts further include receiving sensor data generated by the sensor disposed in the cabin of a machine of the plurality of machines; determining, based at least in part on the sensor data, an alertness metric associated with an operator of the machine; and based at least in part on the alertness metric, determining the first task for completion by the machine. The acts may also include sending, to an electronic device associated with the operator, information about the first route, and receiving confirmation information indicative of the machine traversing along the first route.

In yet another aspect of the present disclosure, an example system includes one or more processors and memory storing processor-executable instructions. When executed by the one or more processors, the instructions configure the system to determine a first task at a worksite for execution by one of a plurality of machines at a worksite, the first task comprising navigating from an origination location to a destination location along a first route, and determine a second task at the worksite for execution by one of the plurality of machines, the second task comprising navigating from the origination location to the destination location along a second route. The instructions may further configure the system to determine a first route score associated with the first route, the first route score being at least one of indicative of an expected impact of the first route on operator alertness or indicative of a difficulty of traversing along the first route and determine a second route score associated with the second route, the second route score at least one of indicative of an expected impact of the second route on operator alertness or indicative of a difficulty of traversing along the second route. The instructions may further configure the system to receive sensor data from a sensor associated with a cabin of a machine of the plurality of machines, determine, based at least in part on the sensor data, an alertness metric associated with an operator of the machine, and select, based at least in part on the first route score, the second route score, and the alertness metric, the first task for completion by the machine. The instructions may further configure the system to generate command data for executing the first task and send the command data to the machine.

DETAILED DESCRIPTION

This disclosure generally relates to the sensing, coordination, and/or control of machines at a worksite using operator alertness data and/or information about tasks to be performed to promote efficient operations at the site. Wherever possible, the same reference numbers will be used through the drawings to refer to the same or like features.

Figure 1:
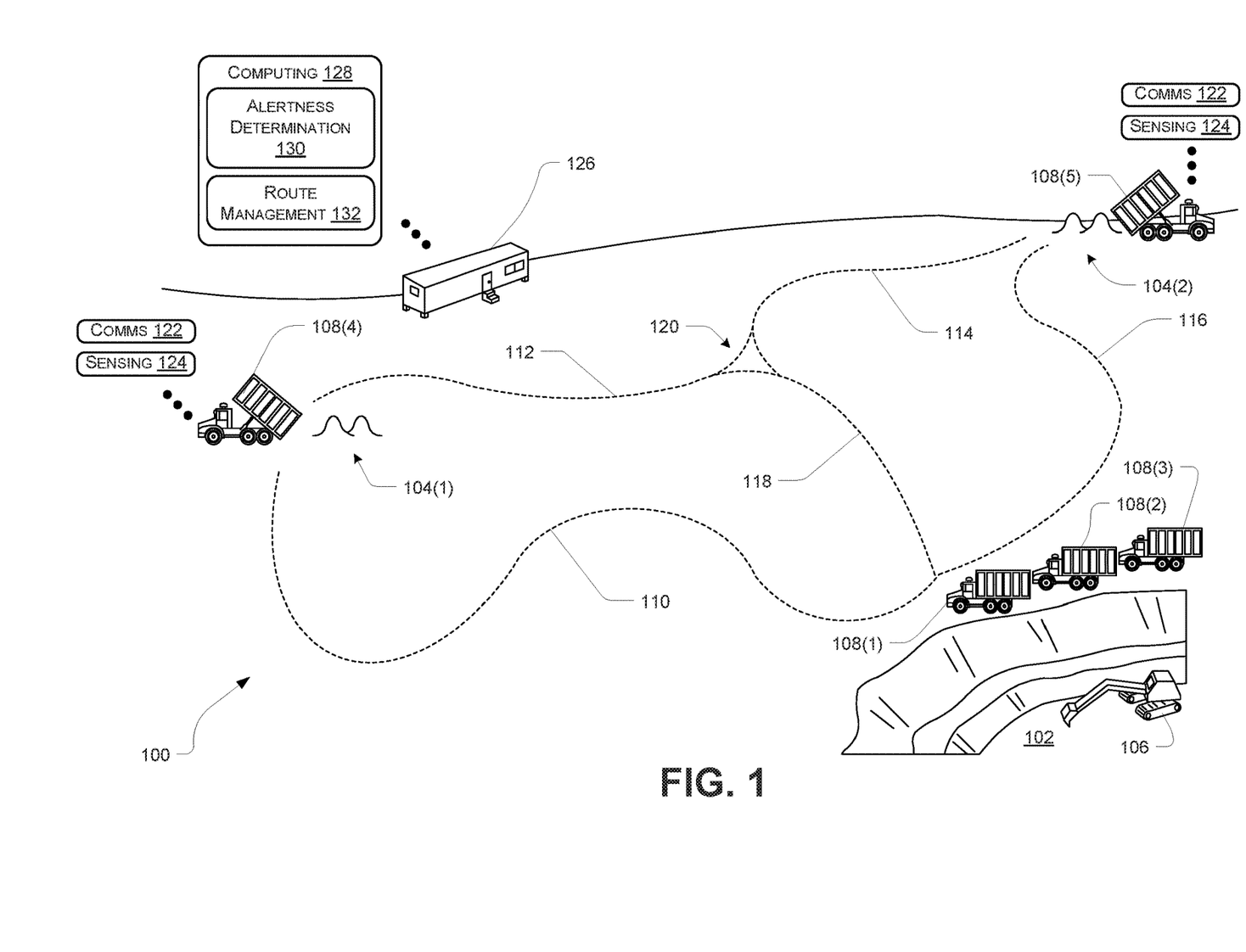
FIG. 1 is a perspective view of a worksite in accordance with an example embodiment of the present disclosure.

Referring to FIG. 1, an example worksite 100 may be a mining location at which a number of operations are being performed. For example, the worksite 100 may include an open-pit mine 102 from which ore and/or other materials may be extracted and a plurality of dumpsites 104(1), 104(2) to which the ore and/or other materials may be transported after excavation. Although only the two dumpsites 104(1), 104(2) are shown, the worksite 100 may include additional or other dumpsites. Herein, the open-pit mine 102 and the two dumpsites 104(1), 104(2) may be referred to as locations or destinations associated with the worksite 102. Moreover, although the locations/destinations are illustrated as the open-pit mine 102 and the dumpsites 104(1), 104(2), the worksite 102 may include additional locations. By way of non-limiting example, the worksite may also include refueling locations, water-filling stations, maintenance locations, additional excavation sites, or the like. The worksite 100 may include any number of locations at which it may be desirable for a machine on the worksite 100 to complete a task. As will be appreciated, although FIG. 1 generally illustrates a mining site and therefore operations particularly suited to mining, aspects of this disclosure may apply to worksites other than a mining site. For example, and without limitation, aspects described herein may be applicable to many geographic locales at which machines are used to carry out coordinated activities. In some instances, the worksite 100 may be an industrial site, a building construction site, a road construction site, a paving site, a quarry, or the like.

FIG. 1 illustrates a number of machines present at the worksite 100 for carrying out tasks. For instance, FIG. 1 illustrates an excavator 106 in the open-pit mine 102 and five haul trucks 108(1), 108(2), 108(3), 108(4), 108(5) (collectively, "the haul trucks 108") performing or positioned to perform various hauling and dumping operations throughout the worksite 100. The excavator 106 and the haul trucks 108 are only examples of machines that may be present at the worksite 100. Other machines, including but not limited to earth-moving machines, e.g., wheel loaders, dump trucks, backhoes, bulldozers, or material handlers, tankers, e.g., for carrying water or fuel, over-the-road vehicles, work machines, e.g., pavers or compactors, or the like also or alternatively may be present at the worksite 100. Moreover, while these and other example machines may be present at the mining worksite 100, other worksites may require different machines. As used herein, the term "machine" may refer to any type of machine that performs some task or operation associated with an industry such as mining, construction, farming, transportation, oil and gas, paving, or any other industry.

As noted, the excavator 106 and the haul trucks 108 are used to perform various tasks at the worksite 100. For instance, the excavator 106 may dig or otherwise remove material from the open-pit mine 102 and the haul trucks 108 may transfer the excavated material to one or more of the dumpsites 104(1), 104(2). The dumpsites 104(1), 104(2) are distanced from the open-pit mine 102 such that the haul trucks 108 have to traverse some amount of the worksite 100 to complete a hauling task. More specifically, the haul trucks 108 may traverse along one or more of a number of routes to navigate the worksite. FIG. 1 illustrates a first route 110 between the open-pit mine 102 and the first dumpsite 104(1), a second route 112 between the open-pit mine 102 and the first dumpsite 104(1), a third route 114 between the open-pit mine 102 and the second dumpsite 104(2), and a fourth route 116 between the open-pit mine 102 and the second dumpsite 104(2). As also illustrated, the second route 112 and the third route 114 have a shared portion 118 extending between the open-pit mine 102 and an intersection 120. The routes 110, 112, 114, 116 are shown for illustration only; additional or other routes may be provided. As described further herein, the routes 110, 112, 114, 116 may have different characteristics. For example, while both the first route 110 and the second route 112 may extend between the open-pit mine 102 and the first dumpsite 104(1), the two routes 110, 112 may have different lengths, different elevation changes, more or fewer turns, more or fewer turns of a certain magnitude (e.g., sharp turns, gentle turns), different compositions (e.g., paved, gravel, rutted), or the like. Similarly, while both the third route 114 and the fourth route 116 may extend between the open-pit mine 102 and the second dumpsite 104(2), the two routes 114, 116 may have different characteristics.

In implementations described herein, based on the characteristics just described and/or other characteristics, each of the routes 110, 112, 114, 116 may be defined by a route score or metric. The route metric may be an indication of a difficulty of the route. For example, the route score may include a numerical a numerical score, e.g., on a scale from 1-10, 1-100, or the like, or the route score may include ranges, e.g., high, medium, low difficulty. The route scores may also be values relative to each other. For example, all routes in a worksite may be ordered, e.g., using a numbering or lettering scheme, e.g., with 1 being most (or least) difficult and ascending numbers designating progressively less (or more) difficult routes. As also detailed further herein, the route metric may be an indication of an expected impact of the route on an operator's alertness. For example, the route metric may be a positive (e.g., expected to increase the operator's alertness) or a negative (e.g., expected to make the operator less alert). The route scores may be static, or may change, e.g., with the weather. Moreover, the route metrics may vary based on the type of machine. By way of non-limiting example, one route may have relatively few turns and may be relatively flat, and thus may be fairly easy to navigate, but may have large ruts that make navigation difficult for machines below a certain size.

One or more of the machines 104 may be configured with or otherwise have access to one or more communication components 122 and/or one or more sensing components 124. For example, the communication component(s) 122 may include a transmitter/receiver, including an antenna, to facilitate wireless communication, e.g., via radio frequency (RF) signals, via a wireless network, such as a local area network (LAN) or a wide-area network (WAN), or any other communication protocol. The communication component(s) 122 may be configured to communicate with a central hub, e.g., at a fixed location, with the central hub being configured to receive all or substantially all communications and route the communications as appropriate. In other implementations, the communication component(s) 122 may be configured to communicate directly with each other, e.g., via a distributed network. Hybrid networks and/or different communication networks and protocols may alternatively be used; this disclosure is not dependent upon a single arrangement, technology, or protocol. The communication component(s) 122 may also include a speaker and/or a microphone to facilitate verbal communication and/or a text input device, e.g., a keypad or touchscreen, to facilitate textual communication. By way of non-limiting example, the communication components 122 may include one or more radios accessible in the haul truck 108, a speaker system in the haul truck 108, one or more microphones disposed in the haul truck 108, a touch screen in the haul truck 108, or the like. Moreover, the communication components 122 may include a radio, mobile phone, tablet device, headset, or other electronic device associated with an operator in the haul truck 108, e.g., that facilitates communication with the operator.

The sensing components 124 may be any number of sensor modalities affixed to or otherwise associated with the haul trucks 108 and/or operators of the haul trucks 108. By way of non-limiting example, the sensing components 124 may include location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), LIDAR sensors, RADAR sensors, ultrasonic transducers, SONAR sensors, etc. Moreover, the sensing components 124 may be configured to sense conditions external to or internal of (e.g. in a cab of) the haul trucks 108 of which they are associated. By way of non-limiting example, the sensing components 124 may include cameras trained on an exterior of the haul trucks 108, e.g., to record video and/or images of an environment of the haul truck(s) 108 and/or cameras trained on an interior of the haul truck(s) 108, e.g., to record video and/or images of an operator of the haul truck(s) 108. An example of interior-trained sensors is illustrated in and described further with reference to FIG. 2.

In further examples, the sensing components 124 may also include wear sensors, e.g., to sense wear of components associated with the machines. By way of non-limiting example, the wear sensors may provide information about tire pressure, tread depth, tool fatigue, braking capacity, clutch wear, or the like. The sensing components 124 may also include safety-related sensors. For example, seat belt sensors may generate information indicative of whether a seat belt is being used by an operator. Similarly, other sensors may generate information indicative of proper use of other safety features. In addition to different types of sensors, the sensing components 124 may also include multiple sensors of the same type. For example, a plurality of microphones, cameras, or LiDAR sensors may be disposed at different locations on the haul truck(s) 108, e.g., to provide information about different portions of the environment of the worksite 100.

As noted above, the sensing components 124 can also be associated with an operator of the haul truck(s) 108. The sensing components 124 can be any number of sensor modalities associated with the operator. By way of non-limiting example, the operator may have one or more associated location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, or environment sensors (e.g., temperature sensors, humidity sensors, light sensors, pressure sensors, etc.). The sensing components 114 may also include sensors for measuring biometric information of the operator, e.g., heart rate, blood pressure, calorie expenditure, distance travelled, and the like. Moreover, the sensing components 124 may include safety-related sensors that generate information about whether the personnel is complying with safety regulations. In some examples, the sensing components 114 may be integrated into one or more electronic devices associated with the operator, including but not limited to a device worn by the operator, e.g. a head-mounted device, a wrist-mounted device, or the like, or a device carried by the operator, e.g., a smart phone, a radio, a tablet, a fob, or the like.

Moreover, in addition to the sensing components 124 associated with the haul truck(s) 108 and/or the operators of the haul truck(s) 108, additional sensors may also be disposed at the worksite 100. For example, additional sensors may include one or more sensor modalities, e.g., an environment sensor, a motion sensor, a camera, a position sensor, a microphone, a LiDAR sensor, a radar sensor, and/or the like, to surveille conditions at the worksite 100. In some examples, the additional sensors may provide additional information. In implementations, such additional information can be used to determine or modify previously-determined route metrics.

The worksite 100 may also include a workstation 126, which may be a room, building, vehicle, or the like, in which one or more personnel may be situated. For example, the workstation 126 may contain one or more offices in which a supervisor, a foreman, and/or different personnel may be stationed. In some implementations, the workstation 126 may act as a hub, for example, serving as a location at which the various machines and personnel are directed or otherwise controlled. To this end, the workstation 126 may include one or more computing systems 128 configured to implement processes described herein. For instance, the computing systems 128 may be configured to receive information from one or more of the sensing components 110, 114 and/or the sensors 116. As will be appreciated from the foregoing, the worksite 100 may include a number of sensors, at a number of locations, to generate varied types of sensor data. For example, data from some of the sensors may be used to determine conditions of a route, such as one of the routes 110, 112, 114, 116, e.g., to determine a route metric or score indicative of attributes of the route. Moreover, as described further herein, data from other of the sensors may be used to determine an operator alertness metric associated with each operator/machine and the computing system 128 may control machines based on the route metric(s) and operator alertness metric(s).

More specifically, FIG. 1 schematically illustrates that the computing system 128 may include an alertness determination component 130. In examples described herein, the alertness determination component 130 may analyze sensor data and/or additional information to characterize an alertness of a machine operator. For example, and as described in more detail with regard to FIGS. 2 and 3, the alertness determination component 130 may determine an alertness metric for an operator based on sensor data, e.g., camera data, taken of the operator while the operator is in the cabin of the vehicle. In other examples, the sensor data may be received from a device associated with the operator, which may be a wearable device in some instances. Additional data that may be considered can include information about the operator, e.g., work history, experience level, route history, or the like, and/or information about the machine(s), e.g., wear information, maintenance history, or the like.

FIG. 1 also illustrates that the computing system 128 may include a route management component 132. In examples described herein, the route management component 132 may coordinate machines, e.g., by controlling the haul truck(s) 108, to perform tasks at the worksite 100. For example, the route management component 132 may consider the alertness metric(s) determined by the alertness determination component 130. The route management component 132 may also determine the route metric(s), environmental conditions, e.g., temperature, precipitation, or the like, machine conditions, and/or other data in determining tasks (and routes accompanying tasks) to be undertaken by the haul truck(s) 108

In examples of FIG. 1, the computing system 128 may determine that materials need to be hauled from the open-pit mine 102 to the first dumpsite 104(1) and to the second dumpsite 104(2). The computing system 128 may also determine that the haul truck 108(1) is in closest proximity to the open-pit mine 102 and thus should be assigned the next task. The alertness determination component 130 may receive information about the operator of the haul truck 108(1) and determine an alertness metric for the operator. For example, if the operator's alertness metric indicates that the operator has an alertness level equal to or above a threshold, the route management system 132 may assign the haul truck 108(1) to carry material to either of the dumpsites 104(1), 104(2) along any of the routes 110, 112, 114. However, in other instances, e.g., when the operator's alertness metric is below the threshold, the haul truck 108(1) may be assigned a task based on the information about the routes. For example, the route management component 132 may determine route scores or metrics for each of the routes 110, 112, 114, 116 and assign the task, e.g., destination and route, based on the route score(s). In some examples, when the operator has lower alertness, the haul truck 108(1) may be assigned the easiest of the routes 110, 112, 114, 116. Similarly, if it is necessary that the haul truck 108(1) transports material from the open-pit mine 102 to the first dumpsite 104(1), the route management component 132 may control the haul truck 108(1) to travel along either the first route 110 or the second route.

In additional examples, the alertness determination component 130 may continue to assess the operator's alertness once a task is assigned. Consider a scenario in which the operator has been assigned to haul materials to the first dumpsite 104(1) along the second route 112. As the haul truck 108(1) traverses along the second route 112, the alertness determination component 130 may determine that the operator's alertness has decreased, e.g., by a threshold amount or below a threshold level. In response, the route management component 132 may determine the route metrics for the second route 112 and for the third route 114. Upon determining that the third route is easier and/or is more likely to increase the operator's alertness, the computing system 128 may instruct the haul truck to divert to the second dumpsite 104(2) along the third route 114. Other examples are described further herein.

Figure 2:
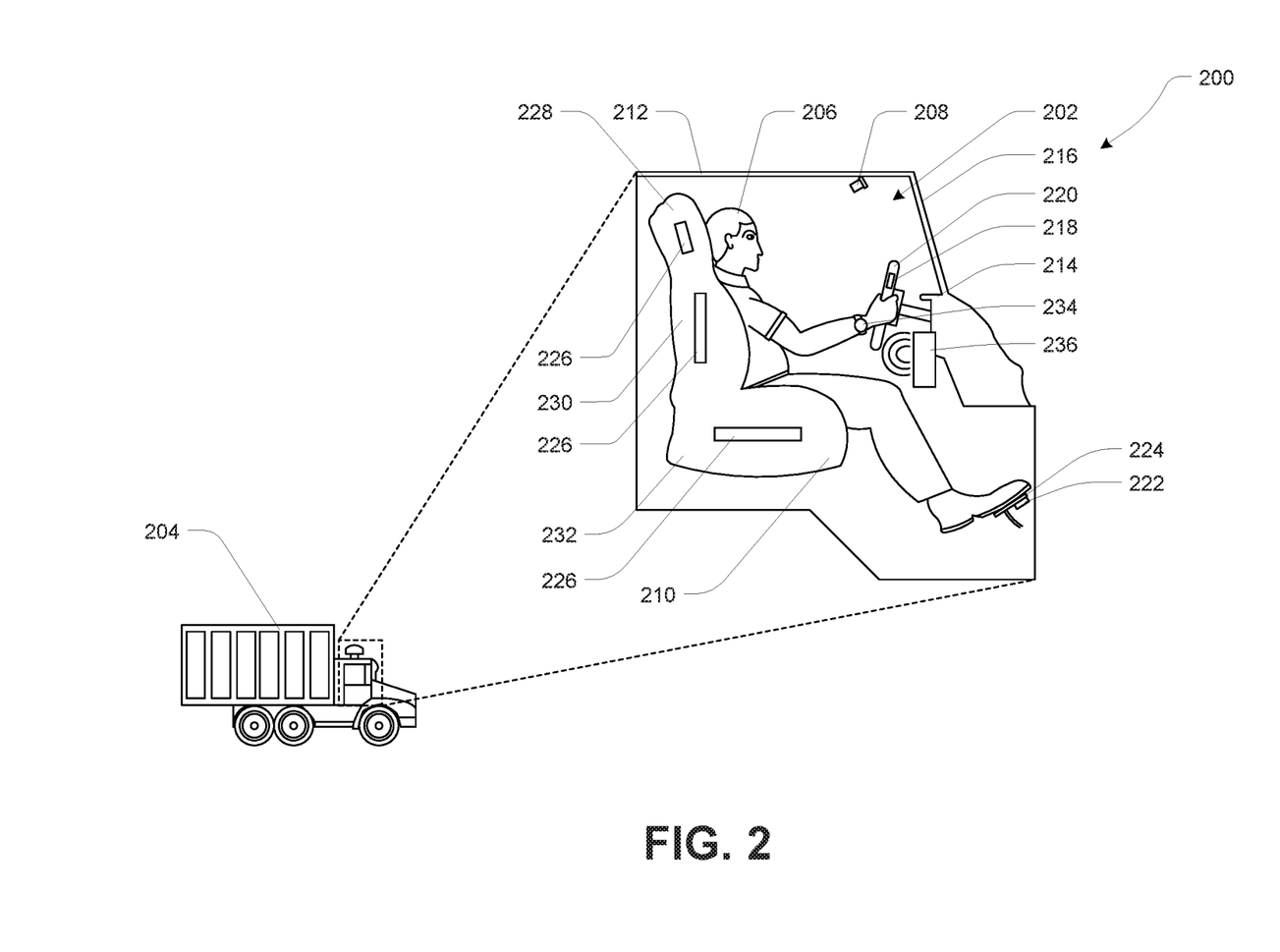
FIG. 2 is a magnified view of an operator cabin of a machine in accordance with an example embodiment of the present disclosure.

FIG. 2 includes a magnified view 200 of an operator cabin 202 of a machine 204. The machine 204 is illustrated as a haul truck, and may be one of the haul trucks 108. However, the machine 204 may be any machine or equipment, including but not limited to the excavator 106 having a cabin in which an operator 206 may be positioned to operate the machine 204. FIG. 2 also illustrates a camera 208 disposed in the cabin 202 and configured to have a field of view in which the operator is positioned when operating the machine. In the illustrated embodiment, the operator 206 operates the machine while seated in a seat 210.

In the illustrated embodiment, the camera 208 is disposed at an inner surface of a roof 212 of the operator cabin 202. For example, the roof 212 may comprise part of a body that generally defines the cabin 202. As noted above, the camera 208 is positioned to capture images of the operator 206, and some implementations, the camera 208 may be configured to capture images of the operator's face. The camera 208 is illustrated as being mounted to the roof, but could be positioned at other locations that allow the camera 208 to capture images of the operator's face. For example, the camera 208 could be mounted or integrated into a rearview mirror (not shown), a dashboard 214, a windshield 216, or other features of the machine 204. Moreover, the camera 208 may be disposed outside the cabin 202, e.g., to view the operator through the windshield 216 or some other glass or opening. Although only a single camera 208 is shown in FIG. 2, in other embodiments one or more additional cameras may also be used. For example, such additional camera(s) may also be used to capture images of the operator's face or one or more of the additional camera(s) may be disposed to capture images of other portions of the operator 206, e.g., the operator's hands, head, legs, etc. In some implementations, the camera 208 and/or the additional camera(s) may be or include any image capturing device, including but not limited to video cameras, thermal cameras, night vision cameras, or the like, used to capture images of the operator 206. As discussed further herein, image and/or other data from the camera 208 and/or any additional cameras may be used, e.g., by the alertness determination component 130, to determine an alertness of the operator 206. For example, the images taken by the camera 208 may be used to determine attributes associated with the operator's eyes, including a direction in which the operator is looking, a frequency at which the operator blinks, whether the operator's eyes are closing for an extended length of time, or other information. Image data from the camera 208 and/or additional cameras may also or alternatively be processed to determine whether the operator is excessively yawning, excessively manipulating buttons or other controls in the cabin 202, and/or making other movements or gestures that may be associated with the operator's alertness.

The cabin 202 may also include a plurality of additional sensors, including but not limited to a steering wheel sensor 218 disposed on or otherwise connected to a steering wheel 220 or another device with which the operator 206 interacts to control the machine 204. Additional sensor(s) may also include one or more pedal sensors 222, associated with one or more pedals 224, e.g., accelerator, brake, and/or clutch pedals, of the machine, and/or one or more seat sensors 226, which may be associated with one or more of a headrest 228, a seat back 230, and/or a seat bottom 232 of the seat 210. The additional sensors may include one or more pressure sensors, position sensors, optical sensors, motion sensors, or the like, and information from the sensor(s) may also be used, e.g., by the alertness determination component 130, to determine an alertness of the operator. For example, information from the steering wheel sensor 218 may be indicative of a movement and/or pressure of the operator's hands relative to the steering wheel 220. For example, certain hand positions and pressures may be associated with an alert driver while other hand positions and pressures may suggest a distracted or fatigued operator. In another non-limiting example, the steering wheel sensor 218 can generate information indicating that the operator's hands have been removed from the steering wheel 220. Similarly, the pedal sensor(s) 222 may detect pressure and/or positioning of the operator's foot relative to the pedal(s) 224. In some examples, a decreased pressure on an accelerator pedal may be associated with increased fatigue. Moreover, an increased pressure on the brake pedal, e.g., resulting in an abrupt deceleration or stop, may signify that the operator is slower to react, and perhaps less alert. In other examples, information from the seat sensor(s) 226 may indicate positioning and/or movement of the operator 202 in the seat 210. In some examples, a current position of the operator 206 in the seat 210 may be compared to positions associated with an alert operator.

Thus, information about the operator 206 may be generated by the one or more cameras, like the camera 208, and/or the one or more sensors, like the sensors 218, 222, 226, and such information may be used to determine an alertness of the operator 206. Other information may also be used to determine the alertness of the operator 206. By way of non-limiting example, the operator 206 may have one or more sensors associated therewith. For example, FIG. 2 illustrates that the operator 206 can wear a wrist-mounted sensor 234, which may measure the operator's heart rate, blood pressure, oxygen level, and/or generate other biometric information. The wrist-mounted sensor 234 may be a smart watch, a fitness tracker, and/or similar device, and is only one example of a sensor that may be associated with the operator. The operator may have other or additional wearable sensors. Moreover, in some examples, the operator may have other or additional associated sensing devices, including but not limited to a smart phone, a tablet, or some other device incorporating one or more sensors to that generate information associated with the operator.

One or more additional components may also be disposed in the cabin 202. For example, FIG. 2 illustrates a radio 236, which may be the communications component 122. For example, the radio 236 may have a speaker configured to output audio commands for the operator 206. By way of non-limiting the example, the operator 206 may receive commands for performing one or more tasks, e.g., travelling to one of the dumpsites 104 or the like, via the radio 236. In some implementations, the radio may also act as a sensing device. For example, the radio 236 may include a positioning sensor for determining a location of the machine 204, a microphone for receiving audible inputs, or the like. As with other cameras and sensors described herein, the radio 236 may be used to determine user alertness. By way of non-limiting example, a time between the operator 206 receiving a command to traverse to a location and a time at which the operator 206 verbally acknowledges the command and/or begins to travel to the location may be indicative of an alertness of the operator 206.

Figure 3:
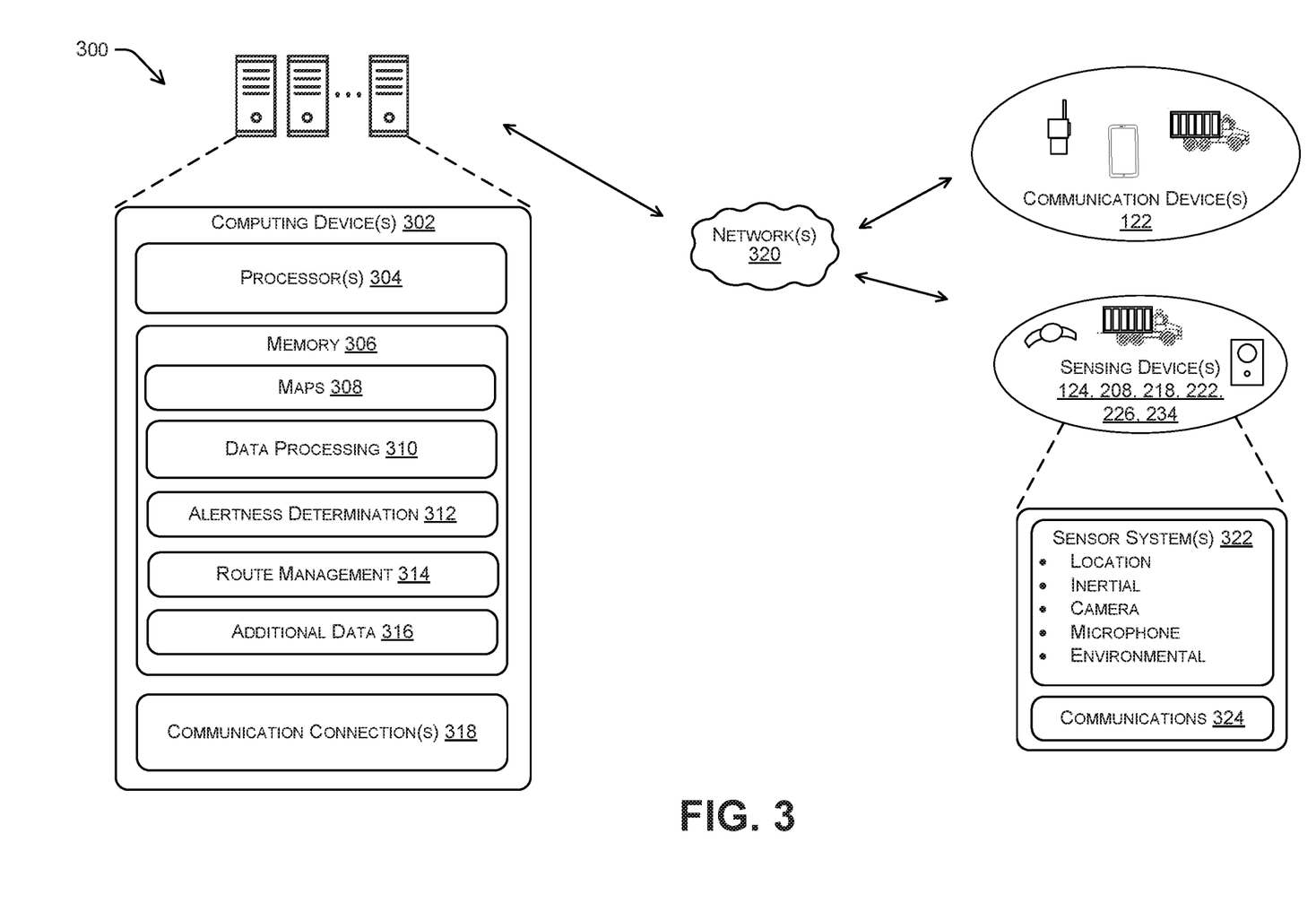
FIG. 3 is an example computing environment for controlling machines using operator alertness in accordance with an example embodiment of the present disclosure.

FIG. 3 is a block diagram illustrating an example system 300 for controlling machines using alertness data according to examples described herein. In at least one example, the system 300 can include one or more computing device(s) 302, which may be the computing system 120 in some implementations. The computing device(s) 302 can include one or more processors 304 and memory 306 communicatively coupled with the processor(s) 304. In the illustrated example, the memory 306 of the computing device(s) 302 stores maps 308, a data processing system 310, an alertness determination system 312 (which may be or include the alertness determination component 124), and a route management system 314 (which may be or include the route management component 132). Although these systems and components are illustrated as, and will be described below as, separate components, functionality of the various systems may be attributed differently than discussed. Moreover, fewer or more systems and components may be utilized to perform the various functionalities described herein. Furthermore, though depicted in FIG. 3 as residing in memory 306 for illustrative purposes, it is contemplated that the maps 308, the data processing system 310, the alertness determination system 312, and/or the route management system 314 may additionally, or alternatively, be accessible to the computing device(s) 302 (e.g., stored on, or otherwise accessible by, memory remote from the computing device(s) 302).

In some examples, the maps 308 may include maps of jobsites or worksites, such as the worksite 100. A map can be any number of data structures modeled in two dimensions or three dimensions that are capable of providing information about an environment, such as, but not limited to, topologies (such as intersections), streets, mountain ranges, roads, terrain, and the environment in general. For examples, the maps 308 may include data structures capable of providing information about locations associated with the open-pit mine 102, the dumpsites 104, and/or the workstation 126, as well as about the routes 110, 112, 114, 116 and the intersection 120. The maps 308 may also include information about buildings and other man-made objects on the worksite 100. As noted above, while the maps 308 may be stored in the memory 306 of the computing device(s) 302, in other implementations, the maps 308 may be accessed by the computing device(s) 302, e.g., via a network 320.

In at least one example, the data processing system 310 can include functionality to receive data from the sensing device(s) 124 and generate information about the worksite based on the received data. For example, the data processing system 310 can determine a position and/or orientation of the machines 106, 108 (e.g., a position in a local or global coordinate system and an orientation in that coordinate system). In some instances, the data processing system 310 can include and/or request/receive a map of an environment (e.g., from the maps 308) and can continuously determine a location and/or orientation of the machines 106, 108 relative to the map. In some instances, the data processing system 310 can receive image data, LIDAR data, radar data, IMU data, GPS data, wheel encoder data, and the like to accurately determine locations of the machines 106, 108. Moreover, in instances in which a machine does not include sensors indicative of its location (e.g., does not include a GPS sensor), the data processing system 310 may determine positions and/or orientations of the machines 106, 108. For instance, the data processing system 310 may process image data captured by sensors at the worksite to identify a machine or person (as discussed below) and determine a position of the identified machine/person relative to other objects having known positions.

Moreover, the data processing system 310 may receive information from the camera 208 and/or one or more of the sensors 218, 222, 226, 234 to determine information about the machine 204 and/or the operator 206, as described further herein. For example, the camera 208 trained on the interior of the machine 204 may recognize the operator 206 of the vehicle, and, although the position of the person may not be known from a device immediately associated with the person, e.g., a wearable or other electronic device associated with the operator, the location of the machine may be known and thus the position of the person may be known.

In some implementations, the data processing system 310 can also process sensor data to identify objects at the worksite. For example, sensors affixed to or otherwise associated with the machines 106, 108, 204 may transmit identification information, e.g., metadata, along with generated sensor data and the data processing system 310 may identify objects using this identification information. Moreover, the data processing system 310 may perform processing on image data generated by cameras in the worksite to determine objects. For example, the data processing system 310 may utilize edge detection and/or feature recognition techniques to identify objects and identify the object by comparing features of those objects to a feature database. Moreover, the data processing system 310 may use sensor data to determine attributes of the worksite 100.

The data processing system 310 is not limited to determining location, position and/or identification. In implementations described herein, the data processing system 310 can determine any number of attributes associated with the worksite 100, and, in particular, attributes associated with the routes 112, 114, 116, 118, the machines 106, 108, 204, and/or the operator 206. For example, the data processing system 310 can receive sensor data from myriad types of sensors and determine one or more conditions associated with the worksite 100 based on the sensor data. In some examples, the data processing system 310 may determine environmental conditions, e.g., temperature, air quality, ambient lighting conditions, wind speed, wind direction, precipitation information, ground quality (e.g., whether a road is passable), or the like. In additional examples, the data processing system 310 may receive data from the sensing component(s) 124 that are indicative of attributes of the machine 106, 108, 204. For example, the data processing system 310 may receive sensor data and determine a level of wear associated with one or more components of the machines 106, 108, 204. In implementations described herein, the data processing system 310 may receive any data, information, signals, and/or the like, e.g., from sensors, cameras, and/or other sources and perform processing to support other components as described further herein. By way of non-limiting example, the data processing system 310 may support the alertness determination system 312 and/or the route management system 314.

In some examples, the alertness determination system 312 (which may be or include functionality associated with the alertness determination component 130) can include functionality to quantify an alertness level of machine operators, including the operator 206. For instance, the alertness determination system 312 may analyze sensor information from any or all of the camera 208 and/or the sensors 218, 222, 226, 234 to determine an alertness metric describing the operator 206. By considering data from a number of sensors to quantify alertness, the alertness determination system 312 may better inform task assignment for the operator 206, and therefore improve efficiency and decrease incidents. In some examples, the alertness determination system 312 may compare sensed conditions of the operator 206 to a database of conditions, e.g., stored as the additional data 316, to determine a value of the alertness metric. For instance, the alertness determination system 312 may consider the image data from the camera 208 to identify blinks of the operator's eyes and compare a number of blinks of the operator 206 and/or a duration for which the operator's eyes stay closed as he blinks to determine whether the user is fatigued and/or falling asleep. Similarly, image data from the camera 208 may suggest that the operator is distracted, e.g., because he continues to divert his gaze from a forward position in which the operator 206 is watching the route in front of the machine. In other implementations, the image data may be analyzed to determine that the operator 206 regularly diverts his eyes from a forward gaze to check his surroundings, e.g., by looking at a rearview mirror and/or a side view mirror. Such actions by the operator 206 could be indicative of a heightened alertness. In other examples, the alertness determination system 312 may compare a position of the operator 206 in the seat 210 to previous positions of the operator 206 and/or to predetermined positions to determine an alertness of the operator 206. For instance, sensor data from the seat sensors 226 may indicate that the operator 206 is slouching in the seat relative to an earlier-determined position of the operator 206. As noted above, the operator's interactions with the steering wheel 220 and/or the pedal(s) 224 may also indicate the alertness of the operator. By way of non-limiting example, detecting, using the steering wheel sensor 218, that the operator has both hands on the steering wheel 220 may suggest that the operator is alert, whereas a single hand or no hands could suggest that the operator is less alert. Moreover, erratic pressure on the pedals 224 may suggest that the operator 206 is distracted or fatigued. As will be appreciated, with the benefit of this disclosure, other information from the sensors may also be used to inform an alertness of the operator.

In other examples, the alertness determination system 312 may consider data other than data from the cameras and sensors disposed in the cabin 202. In some implementations, the alertness determination system 312 may also consider historical data about the operator 206 to determine the alertness metric. For example, the alertness determination system 312 may access information about the operator's current shift, e.g., a duration of the shift, previous tasks undertaken during the shift, or the like, and/or information about previous shifts of the operator 206, e.g., a number of days for which the operator 206 has been working. This information may be informative of the operator's alertness, e.g., because the operator 206 may be expected to be more alert at the beginning of his shift than at the end of the shift and/or because the operator 206 coming off a long weekend may be more alert than the operator 206 working double shifts for three straight days, as examples. Other information may include information about the operator's aptitude, e.g., technical training, educational background, or the like, and/or safety data associated with the operator 206, e.g., the operator's accident or incident history, safety training, or the like. For example, this non-sensor data may be stored as the additional data 316.

The alertness determination system 312 may determine the alertness metric as any number of quantifiable measurements. For example, the alertness metric may be a numerical alertness metric associated with the operator 206, which may be a number in a predetermined range, e.g., 0-10, 0-100, or the like. In other implementations, the alertness metric may be determined as a level, e.g., high, medium, or low; red, orange, yellow; or the like. Moreover, when the alertness metric is determined as a range, the range may be based on a value. By way of non-limiting example, the alertness determination system 312 may determine an alertness value on a scale of 1 to 100, with 1 being the least alert and 100 being the most alert. On this scale, values between 75 and 100 may correspond to a high alertness, values between 25 and 74 may be a medium alertness, and values below 25 may indicate a low alertness. Of course, these numbers are for illustration only. The alertness determination system 312 may use any ranking scheme, thresholds and/or ranges.

In still further implementations, the alertness determination system 312 may determine a relative alertness metric for the operator 206. For example, all of the operators at the worksite 100 may be ranked relative to each other. In some instances, the most alert operator may have an associated alertness metric of "1" or "A," the next most alert operator may have an associated alertness metric of "2" or "B," and so forth. In other implementations, the least alert operator may have the alertness metric of "1" or "A," the next least-alert operator may have the alertness metric of "2" or "B," and so forth. In still further implementations, some top number (e.g., the top 5) or top percentage (e.g., top 10%) of operators and/or of operators above or below a threshold alertness level may be classified together, e.g., as a pool including the most-alert operators.

The alertness determination system 312 may determine the alertness metric for individual of the operators and/or for all operators at the same time. For example, alertness metric(s) may be determined at predetermined times, e.g., when a new task is to be assigned, at discrete times, e.g., every half hour, every hour, or the like, or at other times. In some implementations, the alertness determination system 312 may continuously, e.g., in real-time or near real-time, update alertness metrics associated with the operators at the worksite 100. For example, and as detailed further herein, the alertness metric may be updated while the operator 206 is performing a task, and in some instances, a change in the alertness level associated with the operator 206, e.g., a determination that the operator's alertness level has dropped to or below a threshold, may be used to divert the operator 206 from the current task to a different task.

In some examples, the route management system 314 (which may be or include functionality associated with the route management component 132) can include functionality to control machines to perform tasks, e.g., based on the alertness metric(s) determined by the alertness determination system 312. In some examples, the route management system 314 may assign tasks to operators based on how alert the alertness determination system 312 determines the operator to be. For instance, when an operator is determined to be fatigued, e.g., to have a low alertness level, the route management system 314 may assign the operator to a less difficult task, to a task that is different from tasks recently undertaken by the operator, to a task that may be expected to increase the operator's alertness, or the like. In examples described herein, different tasks may include different routes, such that assignment of the task may include assignment of one or more routes. For instance, the operator 206 may be assigned to haul materials from the open-pit mine 102 to the first dumpsite 104(1) along either the first route 110 or the second route 112. The first route 110 may be longer than the second route 112 and/or may contain more turns, but may be preferred, for example, when the operator 206 has just traversed the second route 112 and/or when the second route 112 been shown to historically increase operator alertness, e.g. because of stimulating scenery or technical features.

The route management system 314 may also determine route metrics or route scores associated with different routes to assist in determining task/route assignments. For example, a route score may be a numerical, letter-based, or other metric that describes a route in the worksite 100. In some example, the route metric may describe a difficulty associated with a route, and may include such factors as distance of the route, altitude changes of the route, surface composition of the route, a number of turns on the route, a radius of turns on the route, or the like. In other examples, the route score may indicate a likely impact on an operator's alertness metric. For instance, routes that include long, smooth rides with little scenery may cause an operator's alertness to decrease, whereas shorter routes with more stimulation, e.g., turns, elevation changes, rougher terrain, may act to increase the alertness metric associated with the operator using such route(s). In examples described herein, the route metric may be a number or letter in a predetermined range, e.g., 0-10, 0-100, or the like. In other implementations, the route metric may be determined as a level, e.g., high, medium, or low, or the like. In some examples, the route metric may be a value on the same scale as the alertness metric. For instance, when the alertness metric is a value from 1 to 100, the route metric may be a value of an expected change to the operator's alertness level if the operator were to take that route. For instance, the route metric may have a −10 or a +7 value, by way of non-limiting example. In these and other examples, the route management system 314 may determine tasks for the operator 206 that will maintain the operator's alertness level at or above a threshold, for example. In some examples, each route may have a static route metric or in other instances, the route metric(s) may vary. For example, changes in the weather, surface conditions, and/or other criteria may cause the route management system 314 to recalculate route metrics. Such changes may be made periodically or dynamically.

In addition to alertness metrics and route metrics, the route management system 314 may also consider additional information, including the additional data 316, to determine assignments for operators. For example, the additional data 316 may include historical data such as previous tasks completed by the operator and/or a work history of the operator. If the operator has just completed a task that includes traversing a certain route, a next task may be to traverse on a different route, even though repeating a task on the first route may be a better match, e.g., may have a better correspondence between the operator's alertness level and the tasks to be completed. In some instance, this historical data may be used to alter the route score(s), e.g., such that the route scores are calculated per-operator. The additional data 316 may also include environmental data, which may be received from sensors fixed at the worksite 100, from the sensing devices 124 associated with one or more of the machines 106, 108, 204 from sensing devices associated with the operator 206, or from other sources. For example, the environmental data may indicate visibility, precipitation, and/or other factors that could influence route assignments. Operator experience may also or alternatively be considered in making route commands. For example, an operator with more experience, fewer incidents and/or advanced technical training may be assigned more difficult routes than an operator with less experience, more incidents, and/or only basic training. Other information that may be relevant is machine information. For example, sensor data that indicates that a machine has excessive wear or the like may be assigned to less difficult or less technical routes. These and other types of data may be used to inform the alertness metric, the route metric, and/or task assignments.

The route management system 314 is described herein in some embodiments as assessing and assigning routes to operators. Although illustrated as being a path from an origination point, e.g., the open-pit mine 102, to a destination point, e.g., one of the dumpsites 104(1), 104(2), a route may be any portion of such a path. By way of non-limiting example, the overlapping portion 118 of the second route 112 and the third route 114 may constitute a route in examples of this disclosure. Moreover, the route management system 314 is not limited to assigning routes. For example, the route management system 314 may assign any number of tasks, which may or may not include traversing along one or more routes. For example, while in some instances the operator 206 may be paired with the machine 204 for an entire shift, in other instances the operator 206 may be instructed to change to a different machine or to do a manual task. In this manner, operator fatigue may be managed, which may result in fewer incidents at the worksite 100.

In addition to assigning tasks to available, e.g., idle, or soon-to-be available machines, the route management system 314 may also monitor the machines and/or operators as they carry out those tasks. For example, the route management system 314 may receive position information from a position sensor on the machine 204 or the operator 206 indicating that the machine 204 is progressing along an instructed route. Moreover, in some instances, the route management system 314 can intervene while the operator 206 is carrying out the task. For example, the route management system 314 may confirm with the operator 206, e.g., by causing an audible output via the speaker 236, that the machine 204 is properly executing the task. In other examples, the route management system 314 may output an instruction to change the task. For example, if it is determined while the machine is travelling along the route 114 that the operator's alertness has significantly decreased, e.g., a value of the operator's alertness metric has reached or surpassed a threshold, the route management system 312 may instruct the operator to change course, e.g., to take the route 116 instead or to stop the machine. In other implementations, the route management system 312 may take control of the machine 204, e.g., by limiting functionality of the machine or shutting the machine down. In addition, or alternatively, upon determining the decrease in alertness, the route management system 312 may cause an audible or haptic output in the cabin 202, to increase the operator's alertness.

The computing device(s) 302 may also include communication connection(s) 318 that enable communication between the computing device(s) 302 and other local or remote device(s). For instance, the communication connection(s) 318 can facilitate communication with the machines 106, 108, 204, the communication devices 122, the sensing devices 124, 208, 218, 222, 226, and/or one or more networks, such as the network(s) 320. In some implementations, the communication connection(s) 318 may also enable communication with one or more remote computing devices, which computing devices may perform one or more of the operations discussed herein as being performed by the computing device(s) 302 and its components. The communications connection(s) 318 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

The processor(s) 304 of the computing device(s) 302 can be any suitable processor capable of executing instructions to process data and perform operations as described herein. By way of example and not limitation, the processor(s) 304 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 306 may be an example of a non-transitory computer-readable media. The memory 306 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As also illustrated in FIG. 3, the computing device(s) 302 may also communicate with the communication devices 122, the sensing components 124, 208, 218, 222, 226, 234. Although the computing device(s) 302 are illustrated as communicating with such machines and devices via the network(s) 320, in other implementations, the computing device(s) 302 may be in direct communication with the machines and/or devices. As further illustrated in FIG. 3, the sensing devices may include one or more sensor system(s) 322. In at least one example, the sensor system(s) 322 can include location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), LIDAR sensors, RADAR sensors, ultrasonic transducers, SONAR sensors, etc. The sensor system(s) 322 can include multiple instances of each of these or other types of sensors. For instance, the machine 204 may have multiple cameras disposed at various locations about the exterior and/or interior of the machine, including the camera 208. The sensor system(s) 322 can provide input to the computing device(s) 302, e.g. via a communications system 324. Additionally, and/or alternatively, the sensor system(s) 322 can send sensor data, via the communications system 324 and/or the network(s) 320, to the computing device(s) 402 at a particular frequency, after a lapse of a predetermined period of time, in near real-time, etc.

It should be noted that FIG. 3 is for illustration only. In alternative examples, components of the computing device(s) 302 can be associated with one or more additional computing device(s) and/or the computing device(s) 302 may have additional functionalities. Moreover, although various systems and components are illustrated as being discrete systems, the illustrations are examples only, and more or fewer discrete systems may perform the various functions described herein. By way of non-limiting example, the route management system 314 may determine route metrics or scores for routes at the worksite 100 or a remote system may determine such scores.

Figure 4:
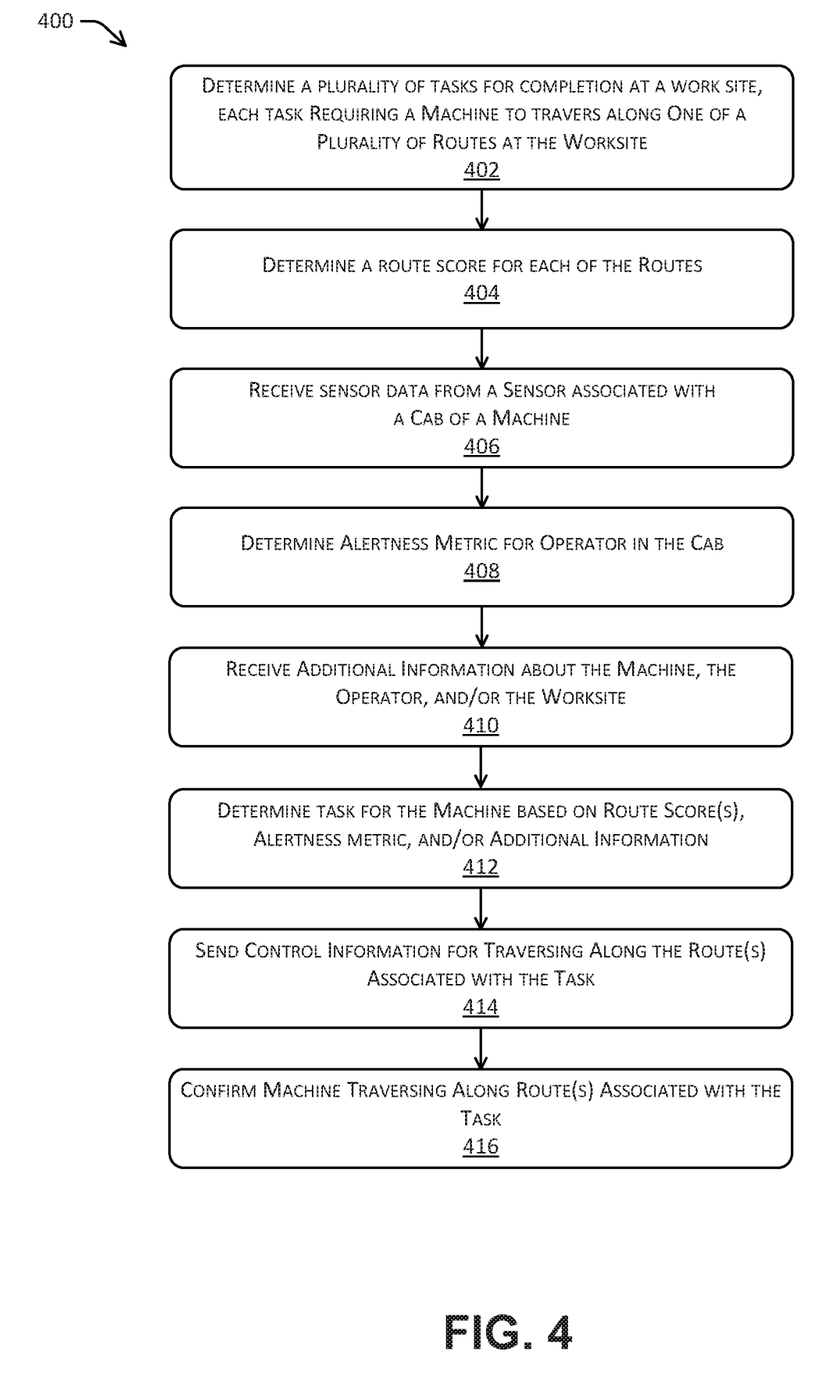
FIG. 4 is a flowchart illustrating an example method of selecting a task for a machine in accordance with an example embodiment of the present disclosure.
Figure 5:
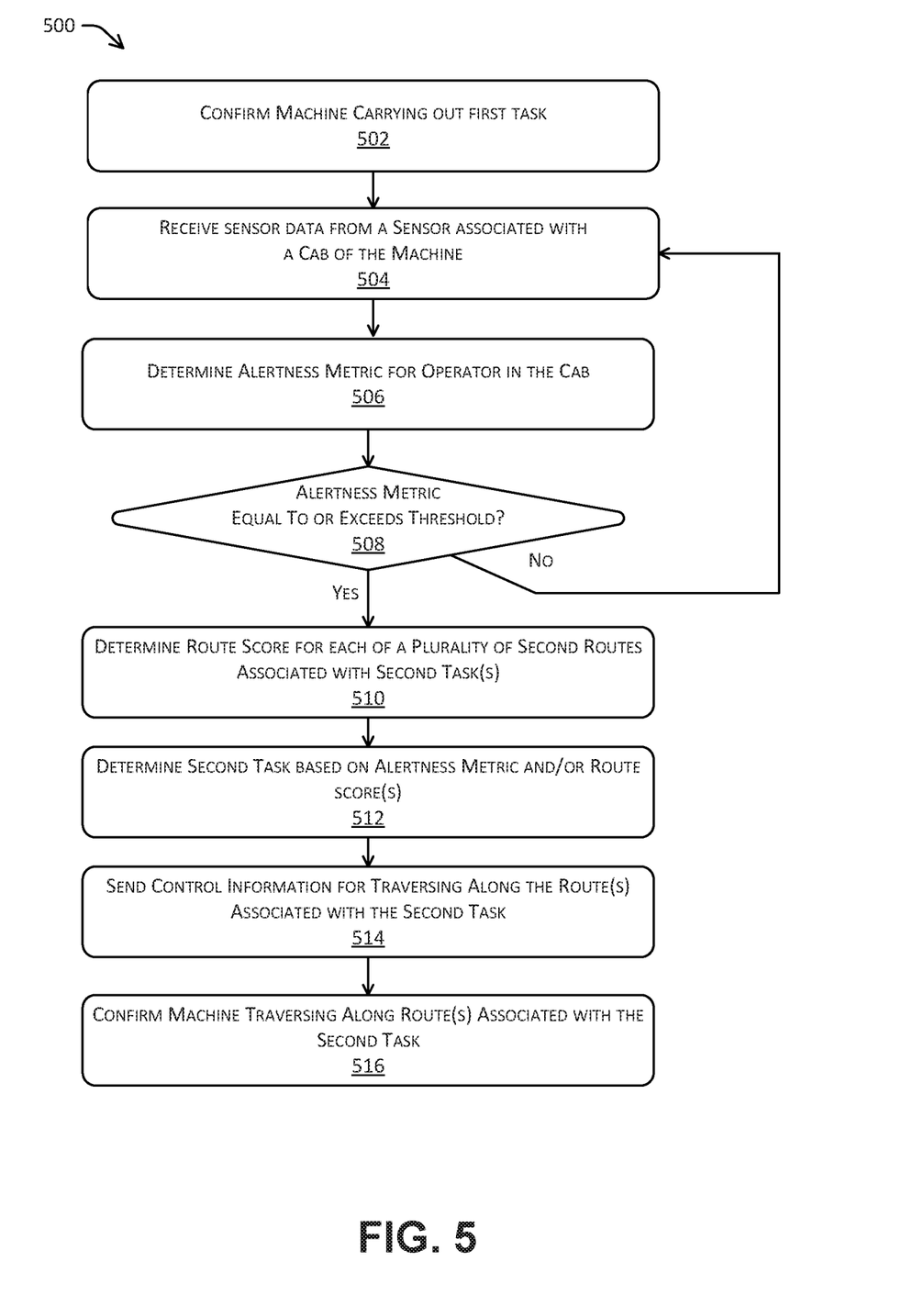
FIG. 5 is a flowchart illustrating an example method of altering a machine task based on operator alertness in accordance with an example embodiment of the present disclosure.

FIGS. 4 and 5 illustrate flow charts depicting example processes 400, 500 of the present disclosure, and relate to controlling machines using operator alertness information. The example processes 400, 500 are illustrated as a collection of steps in a logical flow diagram, which steps represent operations that can be implemented in hardware, software, or a combination thereof. In the context of software, the steps represent computer-executable instructions stored in memory. When such instructions are executed by, for example, the processor(s) 304, such instructions may cause the processor(s) 304, various components of the computing device(s) 302, the machines 106, 108, 204 and/or the communication device(s) 122 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the processes 400, 500 are described with reference to the worksite 100, the machine 204, the computing system 300, and/or other items shown in FIGS. 1-3.

The process 400 is illustrated in FIG. 4 and generally describes a method of controlling machines to perform tasks at a worksite. The process 400 includes, at 402, determining a plurality of tasks for completion at a worksite. Each of the tasks may require a machine to traverse along one of a plurality of routes at the worksite. For example, the computing device(s) 302 may determine tasks to be performed at the worksite 100 based on machines at the worksite 100, work orders, quotas, supply requests, or the like. In the example of FIG. 1, the tasks may be associated with extracting materials from the open-pit mine 102 and transporting those materials to one of the dumpsites 104(1), 104(2). In these examples, one of the machines 108(1), 108(2), 108(3) may be capable of transporting raw material from the open-pit mine 102, e.g., material extracted by the excavator 104, to the first dumpsite 104(1) using either the first route 110 or the second route 112 or the second dumpsite 104(2) using either the third route 114 or the fourth route 114.

The process 400 may also include, at 404, determining a route score for each of the routes. For example, the route management system 314 and/or the route management component 132 may determine a numerical or other value that describes attributes of the routes 110, 112, 114, 116. The route metric may be associated with a difficulty of the route, which may be based on physical attributes of the route, including but not limited to, length, width, elevation changes, surface composition, number of turns, turn radii, or the like. The route metric may also be associated with an expected impact to an alertness metric. For example, the route metric may indicate an expected increase or decrease in alertness for an operator traversing the route. Other details of route metrics are described herein.

The process 400 may also include, at 406, receiving sensor data from a sensor associated with a cab of a machine. For example, at 406, the computing device(s) 302 may receive information about the operator 206 in the cabin 202 of the machine 204. For example, the machine 204 may include one or more of the camera 208, the steering wheel sensor 218, the pedal sensor 222, and/or the seat sensors 226 that generate and transmit information about the operator 206. Moreover, the operator 206 may have one or more associated sensors, including but not limited to the wrist-mounted sensor 234 illustrated in FIG. 2, which also generate and transmit information about the operator 206 in the cabin 202.

The process 400 may also include, at 408, determining an alertness metric for the operator in the cabin. For example, the alertness determination system 312 may analyze the sensor data received at 406 and determine information about how alert the operator 206 is. For example, the alertness determination system 312 may analyze image data from the camera 208 to determine whether the operator 206 is tired and/or distracted, e.g., by analyzing blink patterns and/or a direction of the operator's gaze. In other non-limiting examples, data from the steering wheel sensor 218, the pedal sensors 222, and/or the seat sensors 226 may be analyzed to determining pressure, positioning and/or interaction of the operator 206 with the steering wheel 220, pedal(s) 224, and/or the seat 210, respectively. For example, by comparing detected pressures and/or positions to threshold or stored pressures/positions indicative of alertness, the alertness determination system 312 may determine the alertness metric(s). Biometric information, such as heart rate, blood pressure, or the like, e.g., received from the wrist-mounted sensor 234, may also be used to determine the alertness metric. The alertness determination system 312 may also or alternatively determine alertness based on other information, including but not limited to how long the operator 206 has been operating the machine 204, the operator's experience with the machine 204, or the like. As detailed further above in connection with the discussion of the alertness determination component 130 and the alertness determination system 312, the alertness metric may be calculated based on a number of types of information about the operator, and may be a numerical value, a range, or any other classification.

The process 400 may also include, at 410, receiving additional information about the machine, the operator, and/or the worksite. For example, the computing device(s) 302 may receive the additional information 316, which may include position information (e.g., GPS coordinates, map information, a location name, and/or other information) indicating a location of the machines 106, 108, 204, a task history of the operator 206 (e.g., an identification of routes previously traversed by the operator 206 and/or a duration of the operator's shift), environmental data (e.g., weather, road conditions, visibility, or the like), and/or any other information that be useful to control machines at the worksite. In some implementations, the additional information 316 may be used to determine the route score and/or the alertness metrics.

The process 400 may also include, at 412, determining a task for the machine based on the route score(s), the alertness metric, and/or the additional information. For example, the computing device(s) 302, implementing the route management system 314, and as detailed further herein, may determine a task for the machine. For example, with reference to FIG. 1, the haul truck 108(1) at the open-pit mine may be tasked with transporting material from the open-pit mine 102 to the first dumpsite 104(1) along the first route 112. For example, the route management system 314 may determine that material should go to the first dumpsite 104(1) and may further determine that the first route 112 is preferable to the second route 114. For example, the second route 114 may have a higher route score, e.g., indicating a more difficult route, the operator 208 of the haul truck 108(1)

may be showing signs of moderate fatigue, e.g., as evidenced by the alertness metric, and the additional information may suggest inclement weather. Because the first route 112 is relatively less difficult, it may be preferable. In other implementations, the first route 112 may be preferable because the operator 206 just completed travelling the route 114 and varying the routes may be likely to increase the operator's alertness. Other scenarios are detailed further herein.

The process 400 may also include, at 414, sending control information for traversing along the route(s) associated with the task. For example, the computing device(s) 302 may send an instruction to the operator 206 with instructions to undertake the task, including an identification of the route to take to complete the task. The instruction may be transmitted as a message, such as a text-based or audio-based message to a device associated with machine, e.g., to the radio 236 in the cab 202 of the machine 206, or associated with the operator, such as via a radio or other electronic device associated with the operator 206. In other implementations, the control information may include instructions for configuring one or more aspects of the machine. For example, when the operator 206 is showing signs of fatigue, the computing device(s) 302 may configure the radio 236 to emit periodic audible outputs and/or may cause haptic outputs in the seat. Such outputs may be useful to increase the operator's alertness, for example.

The process 400 may also include, at 416, confirming that the machine is traversing along the route(s) associated with the assigned task. For example, the computing device(s) 302 may receive position information from the machine 204 or from a device associated with the operator 206, such as the wrist-mounted sensor 234 to confirm that the operator is on the assigned route. In other examples, the operator 206 may manually confirm receipt of the control information, e.g., by verbally acknowledging receipt and/or by accepting the task instructions on an electronic device.

FIG. 5 illustrates the process 500. More specifically, the process 500 may describe techniques for re-tasking a machine that has already commenced a first task, e.g., because the operator's alertness has decreased, and thus it may be beneficial to re-task the operator and machine. More specifically, at 502, the process 500 includes confirming that a machine is carrying out a first task. For example, 502 may be the same as or similar to 416 discussed above. In some examples, the computing device(s) 302 may receive position information from the machine 204 or from a device associated with the operator 206, such as the wrist-mounted sensor 234 to confirm that the operator is on an assigned route. In other examples, the operator 206 may manually confirm receipt of the control information, e.g., by verbally acknowledging receipt and/or by accepting the task instructions on an electronic device. For purposes of example only, in one implementation, the machine 206 may have been tasked with hauling raw materials from the open-pit mine 102 to the first dumpsite 104(1) along the second route 112. At 502, the computing device(s) 302 may determine that the machine 208 is somewhere along the shared route portion 118, and thus confirm that the machine is properly executing the task.

The process 500 may also include, at 504, receiving sensor data from a sensor associated with a cab of the machine. For example, at 406, the computing device(s) 302 may receive information about the operator 206 in the cabin 202 of the machine 204. For example, the machine 204 may include one or more of the camera 208, the steering wheel sensor 218, the pedal sensor 222, and/or the seat sensors 226 that generate and transmit information about the operator 206. Moreover, the operator 206 may have one or more associated sensors, including but not limited to the wrist-mounted sensor 234 illustrated in FIG. 2, which also generate and transmit information about the operator 206 in the cabin 202. In implementations described herein, the sensor data is received while the machine is completing the task.

The process 500 may also include, at 506, determining an alertness metric for the operator in the cab. For example, the alertness determination system 312 may analyze the sensor data received at 504 and determine information about how alert the operator 206 is. For example, the alertness determination system 312 may analyze image data from the camera 208 to determine whether the operator 206 is tired and/or distracted, e.g., by looking away from the route. In other non-limiting examples, data from the steering wheel sensor 218, the pedal sensors 222, and/or the seat sensors 226 may be analyzed to determining pressure, positioning and/or interaction of the operator 206 with the steering wheel 220, pedal(s) 224, and/or the seat 210, respectively. For example, by comparing detected pressures and/or positions to threshold or stored pressures/positions indicative of alertness, the alertness determination system 312 may calculate the alertness metric. Similarly, biometric information, such as heart rate, blood pressure, or the like, received from the wrist-mounted sensor 234, may also be used to determine the alertness metric. As detailed further above in connection with the discussion of the alertness determination component 130 and the alertness determination system 312, the alertness metric may be calculated based on a number of types of information about the operator, and may be a numerical value, a range, or any other classification.

The process 500 may also include, at 508, determining whether the alertness metric is equal to or exceeds a threshold. For example, the techniques described herein may compare the alertness metric determined at 506 to one or more thresholds to determine whether the operator 206 is sufficiently alert to continue carrying out the task. In examples where the alertness metric is a numerical value, e.g., an integer in a range from 1-100 with 1 being the least alert and 100 being the most alert, techniques described herein may determine that the alertness metric associated with the operator 206 has fallen below a threshold value, e.g., 75 or 50. In other implementations, the threshold may be based on a previously-determined alertness metric associated with the operator 206. For instance, the threshold may be 10 points lower than the alertness metric associated with the operator 206 at the time of beginning the task. Thus, if the operator 206 had an associated alertness metric of 74 at the time of being assigned the task, and the alertness metric determined at 506 is above 64, the alertness metric does not meet or exceed the threshold, and thus, the process 500 returns to 504, e.g., to continue monitoring the operator. If however, in this example, the alertness metric determined at 506 is equal to or less than 64, process 500 continues to 510.

The process 500 includes, at 510, determine a route score for each of a plurality of second routes associated with one or more second tasks. For example, the route management module may determine one or more other tasks to which the operator 206 could be re-tasked, and route score(s) may be determined for those tasks. For instance, the route management system 314 and/or the route management component 132 may determine a numerical or other value that describes attributes of other routes that may be taken. In the example in which the machine 204 is traversing along the second route 114 the route management system 314 may determine a route score for the third route 116. In some instances, at

510, the route management system 314 may also re-calculate a route score for the second route 114. As detailed further herein, the route metric may be associated with a difficulty of the route and may be based on physical attributes of the route, including but not limited to, length, width, elevation changes, surface composition, number of turns, turn radii, or the like. The route metric may also be associated with an expected impact to an alertness metric. For example, the route metric may indicate an expected increase or decrease in alertness for an operator traversing the route.

The process 500 also includes, at 512, determining a second task based on the alertness metric and/or the route scores. For example, the route management system 314 may determine that another route is preferable for the operator 206, based on determining that the operator 206 is fatigued. Continuing the example from above, the route management system 314 may determine that the third route 114 is preferable to continuing on the second route 112. In some examples, the route score associated with the third route 114 may indicate that the third route is less difficult and therefore may require the operator 206 to be less alert. In other examples, it may be determined that the route score associated with the third route 114 will have less of a negative impact on the operator's alertness than continuing on the second route 112. Other examples also are contemplated, and will be appreciated by those having the benefit of this disclosure.

The process 500 may also include, at 514, sending control information for traversing along the route(s) associated with the second task. For example, the computing device(s) 302 may send an instruction to the operator 206 with instructions to undertake the second task, including an identification of the route to take to complete the task. The instruction may be transmitted as a message, such as a text-based or audio-based message to a device associated with machine, e.g., to the radio 236 in the cab 202 of the machine 206, or associated with the operator, such as via a radio or other electronic device associated with the operator 206. In other implementation, the control information may include instructions for configuring one or more aspects of the machine. For example, when the operator 206 is showing signs of fatigue, the computing device(s) 302 may configure the radio 236 to emit periodic audible outputs and/or may cause haptic outputs in the seat. Such outputs may be useful to increase the operator's alertness, for example.

The process 500 may also include, at 516, confirming that the machine is traversing along the route(s) associated with the second task. For example, the computing device(s) 302 may receive position information from the machine 204 or from a device associated with the operator 206, such as the wrist-mounted sensor 234, to confirm that the operator is on the assigned route. In other examples, the operator 206 may manually confirm receipt of the control information, e.g., by verbally acknowledging receipt and/or by accepting the task instructions on an electronic device.

INDUSTRIAL APPLICABILITY

The present disclosure provides systems and methods for identifying tasks to be completed at a worksite 100, and controlling machines 106, 108, 204 to carry out those tasks. Such systems and methods may be used to more efficiently coordinate activities of the machines 106, 108, 204 during operations at the worksite 100. For example, such systems and methods may enable a computing system 120 to determine attributes of the worksite 100 with greater confidence, quantify attributes of the worksite, the machine(s) and/or operators of the machine(s) to better control the worksite and maintain incident-free operation at the worksite. As a result, the computing system may coordinate operations to be performed with improved accuracy, and thus, may maximize efficiency at the worksite 100. Additionally, such systems and methods may be used to more accurately manage the operation of the machines at the worksite 100, thereby reducing operating costs.

As noted above with respect to FIGS. 1-5, example processes of controlling machines at a worksite 100 may include receiving sensor data from one or more sensing devices 208, 218, 222, 226, 234 disposed to receive information about an operator 206 of a machine 204. In some examples, the sensor data may provide information about an alertness of the operator 206. Using the sensor data, the techniques described herein may determine an alertness metric associated with the operator 206. For example, the alertness metric may be a numerical value indicative of how alert (or fatigued) the operator is. The processes may also include determining tasks to be performed at the worksite 100, and determining route scores associated with those tasks. In the example of FIG. 1, tasks at the worksite may include traversing along one of the routes 110, 112, 114, 116 and route scores may be determined for each of the routes.

The process may also include controlling the machines to carry out tasks based on the one or more taking one or more actions to mitigate one or more of the conditions, thereby reducing the risk factor. By way of non-limiting example, techniques described herein may cause the computing system 120 to control a machine 104 to shut down when a value of the risk factor is equal to or exceeds a threshold. In other implementations, the computing system 120 may transmit a message or the like to personnel 106 at the worksite, with instructions for mitigating the risk.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A method comprising:
    determining a first task for completion at a worksite, completion of the first task requiring one of a plurality of machines to traverse along a first route;
    determining a second task for completion at a worksite, completion of the second task requiring the one of the plurality of machines to traverse along a second route;
    determining a first route score for the first route, the first route score being at least in part indicative of a difficulty of traversing along the first route;
    determining a second route score for the second route, the second route score being at least in part indicative of a difficulty of traversing along the second route;
    receiving sensor data generated by a sensor associated with a first machine of the plurality of machines;
    determining, based at least in part on the sensor data, an alertness metric associated with an operator of the first machine;
    based at least in part on the alertness metric, the first route score, and the second route score, determining the first task for completion by the first machine;

sending, to an electronic device associated with the operator of the first machine, information about the first route;
receiving confirmation information indicative of the first machine traversing along the first route;
receiving updated sensor data generated by the sensor while the first machine is travelling along the first route;
determining, based at least in part on the updated sensor information, an updated alertness metric associated with the operator of the first machine;
based at least in part on the updated alertness metric meeting or exceeding a threshold alertness metric, determining a third task requiring the first machine to traverse along an updated route, the updated route comprising a third route from a current location to a first destination having a third route score or a fourth route from the current location to a second destination having a fourth route score;
sending, to the electronic device, information about the updated route;
and receiving updated confirmation information indicative of the machine performing the third task.

2. The method of claim 1, further comprising:
determining the third route score for the third route, the third route score being at least in part indicative of a difficulty of traversing along the third route; and
determining the fourth route score for the fourth route, the fourth route score being at least in part indicative of a difficulty of traversing along the fourth route,
wherein the updated route is the third route or the fourth route having the lower respective third route score or fourth route score.

3. The method of claim 2, further comprising:
determining that the third route score is different from the first route score; and
selecting the third task for completion by the first machine based at least in part on the third route score.

4. The method of claim 1, wherein the sensor data comprises first sensor data and the sensor comprises a first sensor, the method further comprising:
receiving second sensor data from one or more second sensors associated with the first machine, the second sensor data comprising at least one of data about one or more components of the first machine or wear data associated with the one or more components; and
receiving third sensor data from one or more third sensors disposed at the worksite, the third sensor data comprising environmental information associated with at least one of the first route or the second route, the environmental information comprising at least one of temperature information, visibility information, precipitation information, or ground conditions,
wherein the determining the first task or the second task for the first machine is based at least in part on the second sensor data and the third sensor data.

5. The method of claim 1, wherein at least one of determining the first route score or determining the second route score is based at least in part on an elevation change, a route distance, a route curvature, or a route surface.

6. The method of claim 1, wherein the receiving the confirmation information includes:
receiving location information indicative of a position of the first machine; and
determining that the position of the first machine is on the first route or the second route.

7. The method of claim 1, wherein the determining the alertness metric associated with the operator of the first machine is further based at least in part on one or more of a task history comprising tasks previously undertaken by the operator, an incident history associated with the operator, an experience level of the operator, or biometric information about the operator.

8. A system comprising:
a plurality of machines disposed at a worksite, individual of the machines comprising:
a body,
a cabin defined at least in part by the body, and
a sensor disposed in the cabin;
one or more processors; and
memory storing processor-executable instructions that, when executed by the one or more processors, configure the system to perform acts comprising:
determining a first task for completion at the worksite, completion of the first task requiring one of the plurality of machines to traverse along a first route from an origination location to a first destination;
determining a second task for completion at the worksite, completion of the second task requiring one of the plurality of machines to traverse along a second route from the origination location to a second destination;
receiving sensor data generated by the sensor disposed in the cabin of a machine of the plurality of machines;
determining, based at least in part on the sensor data, an alertness metric associated with an operator of the machine;
based at least in part on the alertness metric, determining the first task for completion by the machine;
sending, to an electronic device associated with the operator, information about the first route;
receiving confirmation information indicative of the machine traversing along the first route;
receiving updated sensor data generated by the sensor while the machine is traversing along the first route;
determining, based at least in part on the updated sensor information, an updated alertness metric associated with the operator of the first machine;
based at least in part on the updated alertness metric meeting or exceeding a threshold, determining a third task, completion of the third task requiring one of the first machine to traverse from a current location along a third route to the first destination or the machine to traverse from the current location along a fourth route to the second destination; and
receiving updated confirmation information indicative of the machine performing the third task.

9. The system of claim 8, the acts further comprising:
determining a first route score for the first route, the first route score being based at least in part on one or more attributes of the first route; and
determining a second route score for the second route, the second route score being based at least in part one or more attributes of the second route,
wherein the determining the first task is based at least in part on the first route score and the second route score.

10. The system of claim 9, the acts further comprising:
determining that the alertness metric meets or exceeds a threshold, wherein the determining the first task is based at least in part on the first route score and the second route score indicating that the first route is less difficult to traverse than the second route.

11. The system of claim 9, wherein at least one of determining the first route score or determining the second route score is based at least in part on an elevation change, a route distance, a route curvature, an expected impact of a route on the alertness metric, or a route surface.

12. The system of claim 8, wherein the determining the third task is based at least in part on the third task being easier than the first task.

13. The system of claim 12, the acts further comprising:
determining a third route score for the third route and a fourth route score for the fourth route, the third route score and the fourth route score being different from a first route score associated with the first route; and
selecting the third task for completion by the first machine based at least in part on the third route score and the fourth route score.

14. The system of claim 8, the acts further comprising:
determining that the alertness metric meets or exceeds a threshold,
wherein the determining the first route is further based on at least one of the machine having previously traversed along the second route, a distance of the first route being shorter than a distance of the second route, the first route having more turns than the second route, or the first route having a higher difficulty than the second route.

15. The system of claim 8, wherein the sensor data comprises first sensor data and the sensor comprises a first sensor, the acts further comprising:
receiving second sensor data from one or more second sensors associated with the machine, the second sensor data comprising at least one of data about one or more components of the machine or wear data associated with the one or more components; and
receiving third sensor data from one or more third sensors disposed at the worksite, the third sensor data comprising environmental information associated with at least one of the first route or the second route, the environmental information comprising at least one of temperature information, visibility information, precipitation information, or ground conditions,
wherein the determining the first task is based at least in part on the second sensor data and the third sensor data.

16. The system of claim 8, wherein the receiving the confirmation information includes:
receiving location information indicative of a position of the machine; and
determining that the position of the machine is on the first route.

17. The system of claim 8, wherein the determining the alertness metric associated with the operator of the machine is further based at least in part on one or more of a task history comprising tasks previously undertaken by the operator, an incident history associated with the operator, an experience level of the operator, or biometric information about the operator.

18. A system comprising:
one or more processors; and
memory storing processor-executable instructions that, when executed by the one or more processors, configure the system to:
determine a first task at a worksite for execution by one of a plurality of machines at a worksite, the first task comprising navigating from an origination location to a destination location along a first route;
determine a second task at the worksite for execution by one of the plurality of machines, the second task comprising navigating from the origination location to the destination location along a second route;
determine a first route score associated with the first route, the first route score being at least one of indicative of an expected impact of the first route on operator alertness or indicative of a difficulty of the first route;
determine a second route score associated with the second route, the second route score being at least one of indicative of an expected impact of the second route on operator alertness or indicative of a difficulty of the second route;
receive sensor data from a sensor associated with a cabin of a machine of the plurality of machines;
determine, based at least in part on the sensor data, an alertness metric associated with an operator of the machine;
select, based at least in part on the first route score, the second route score, and the alertness metric, the first task for completion by the machine;
generate command data for executing the first task;
send the command data to the machine;
receive updated sensor data generated by the sensor while the machine is executing the first task;
determine, based at least in part on the updated sensor information, an updated alertness metric associated with the operator of the machine;
based at least in part on the updated alertness metric meeting or exceeding a threshold, determine a third task, completion of the third task requiring the machine to traverse from a current location along a fourth route to a second destination;
generate updated command data for executing the third task; and
send the updated command data to the machine.

19. The system of claim 18, the processor-executable instructions further configuring the system to:
receive updated confirmation information indicative of the machine performing the third task.

20. The system of claim 18, the processor-executable instructions further configuring the system to:
determine that the alertness metric meets or exceeds a threshold,
wherein the determining the first route is further based on at least one of the machine having previously traversed along the second route, a first distance of the first route being shorter than a second distance of the second route, the first route having more turns than the second route, or the first route having a higher difficulty than the second route.

* * * * *